United States Patent [19]

Danek

[11] 3,752,008
[45] Aug. 14, 1973

[54] CABLE LENGTH ADJUSTER
[75] Inventor: Michael J. Danek, Laingsburg, Mich.
[73] Assignee: General Motors Corporation, Detroit, Mich.
[22] Filed: Aug. 31, 1971
[21] Appl. No.: 176,477

[52] U.S. Cl. .................................. 74/501 R, 161/5
[51] Int. Cl. ............................................. F16c 1/10
[58] Field of Search .................. 74/501, 501 P, 513; 161/190

[56] References Cited
UNITED STATES PATENTS

| | | | |
|---|---|---|---|
| 2,438,380 | 3/1948 | Arens | 74/501 |
| 2,729,618 | 1/1956 | Muller | 260/75 |
| 3,196,706 | 7/1965 | Sevrence | 74/501 |
| 3,462,328 | 8/1969 | Buckland | 161/190 |
| 3,550,673 | 12/1970 | Gallagher | 161/190 |
| 3,662,617 | 5/1972 | Bennett | 74/501 |
| 3,187,603 | 6/1965 | Haddad | 74/513 |
| 3,675,731 | 7/1972 | Stopera | 74/513 |

Primary Examiner—Charles J. Myhre
Assistant Examiner—Wesley S. Ratliff, Jr.
Attorney—Warren E. Finken, John P. Moran et al.

[57] ABSTRACT

The cable length self-adjusting arrangement illustrated includes an accelerator pedal and a pivotable lever having a cable extending therefrom to a transmission detent valve. The detent valve cable is freely mounted through a bracket on the accelerator pedal lever. A spherical member is secured to the cable with a polyurethane sleeve member initially loosely mounted around the cable between the bracket and the spherical member. Upon the initial depression of the accelerator pedal after assembly, the bracket abuts against the sleeve member which, in turn, abuts against the spherical member, causing the detent valve to quickly bottom out. Full depression of the pedal thereafter to its wide open throttle position forces the sleeve member over the spherical member to a final position which is thereafter retained to coordinate the bottomed out position with the wide open throttle position of the accelerator pedal.

7 Claims, 4 Drawing Figures

Patented Aug. 14, 1973

3,752,008

INVENTOR.
Michael J. Danek
BY
John P. Moran
ATTORNEY

CABLE LENGTH ADJUSTER

This invention relates generally to a cable length adjuster and, more particularly, to a self-adjusting means for coordinating the downshift position of a transmission detent valve with the wide open throttle position of an accelerator pedal.

Various means have been used to initially adjust the effective length of a cable so as to coordinate the full travel position of a transmission detent valve with carburetor and accelerator wide open throttle positions, and to thereafter retain the adjusted length.

A general object of the invention is to provide an improved means for automatically attaining the above-described cable length adjustment.

Another object of the invention is to provide a cable leading from a transmission detent valve and having a spherical member secured at a predetermined location thereon, with a polyurethane sleeve member initially loosely mounted on the cable intermediate the spherical member and a bracket formed on the accelerator pedal lever, such that the initial full depression of the accelerator pedal forces the sleeve member over the spherical member to a fixed position thereon to thus coordinate the wide open throttle position of the pedal with the fully actuated downshift position of the detent valve.

These and other objects and advantages of the invention will become apparent when reference is made to the following description and accompanying drawings, wherein.

Figure 1:
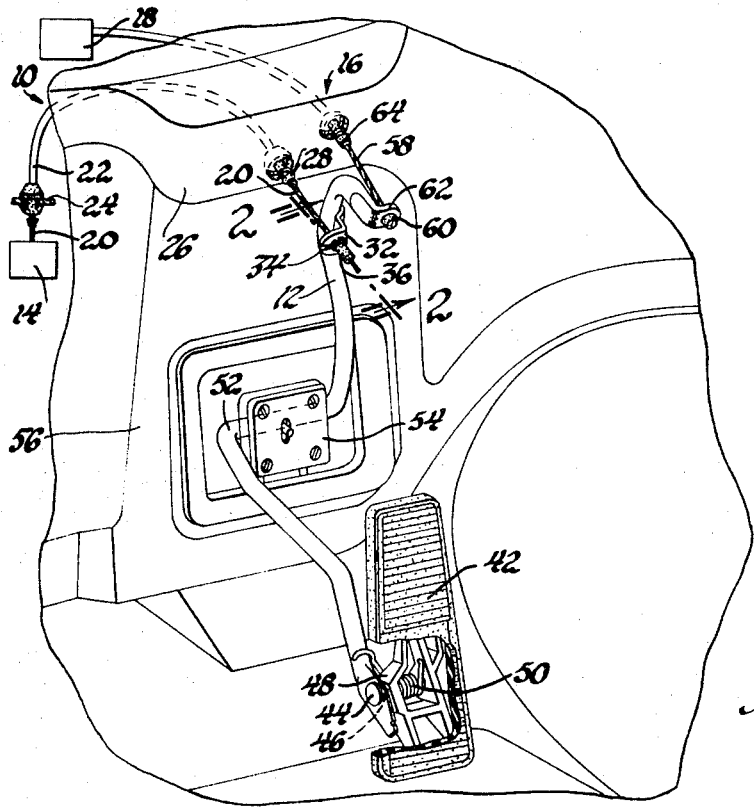
FIG. 1 is a perspective view of the invention.

Referring now to the drawings in greater detail, FIG. 1 illustrates a self-adjusting downshift cable arrangement 10 interconnected between an accelerator lever 12 and a transmission detent valve, represented generally at 14. A second cable arrangement 16 is interconnected between the lever 12 and conventional carburetor throttle plates, represented generally at 18. In a typical application, it is essential that the detent valve 14 be coordinated to bottom out in the transmission when the throttle plates 18 and the accelerator pedal lever 12 attain their wide open throttle (WOT) positions.

Figure 2:
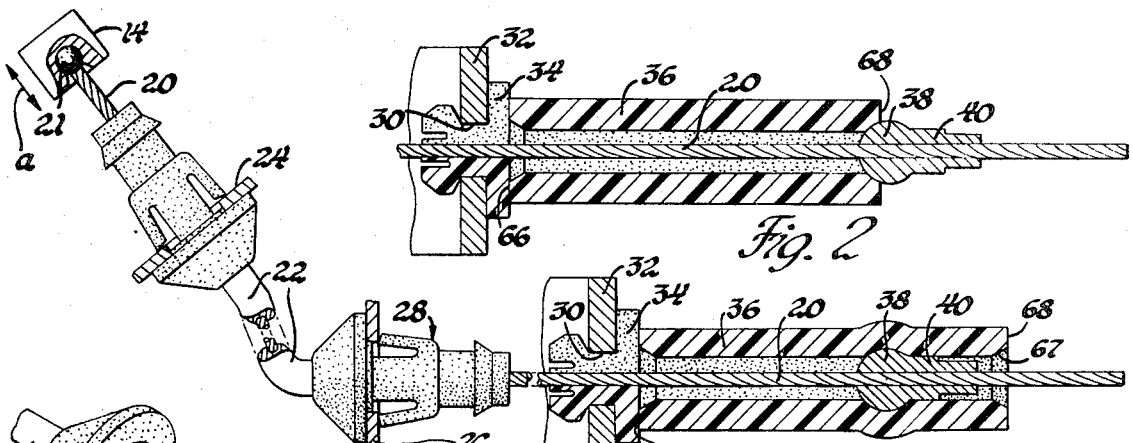
FIG. 2 is an enlarged cross-sectional view taken along the plane of line 2—2 of FIG. 1 and looking in the direction of the arrows.
Figure 3:
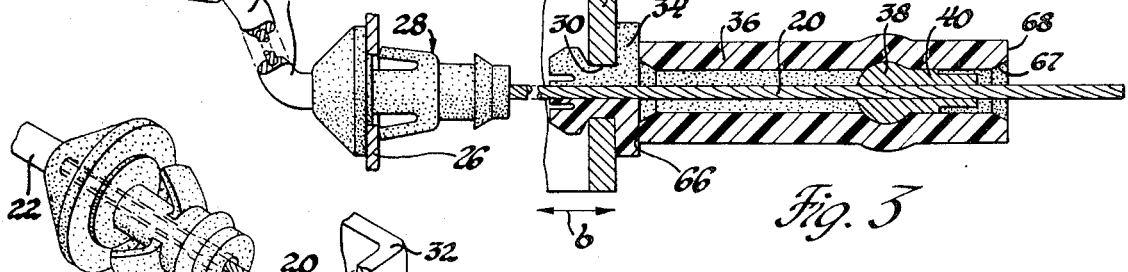
FIG. 3 is a view of the FIG. 2 structure in a different operative position.
Figure 4:
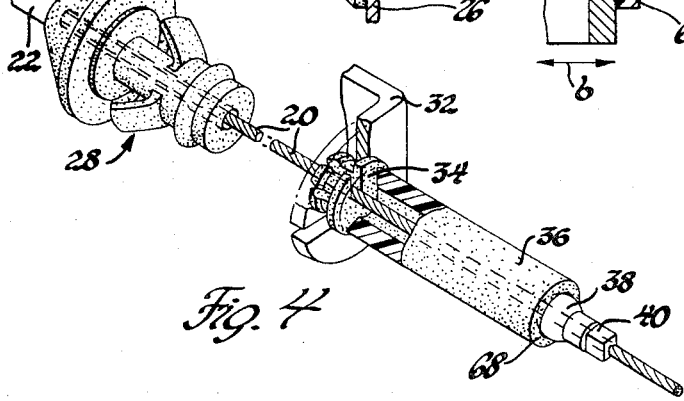
FIG. 4 is an enlarged perspective view of a portion of FIG. 1.

The self-adjusting downshift cable arrangement 10 includes a cable 20 operatively connected by a suitable attachment clip or fastener 21 (FIG. 3) permanently fastened to the cable at its lower end for attachment to the transmission detent valve 14 and being slidably mounted in a conventional sheath 22, the sheath 22 being secured at one end to a fixed abutment 24 adjacent the transmission, and at its other end to the engine side of the dashboard 26. The cable 20 extends from the sheath 22 through a fitting 28 secured to the dashboard 26 and thence through an opening 30 (FIG. 2) formed in a slotted bracket member 32 secured to the lever 12 adjacent the upper end thereof. A slotted retainer 34 is snapped in the opening 30 of the bracket member 32 with the respective slotted portions thereof misaligned after the assembly therethrough of the cable 20.

A sleeve member 36 is initially loosely mounted around the extended cable 20 beyond the bracket member 32. The sleeve member 36 is made of a suitable synthetic rubber or elastomeric plastic which is resilient, tough, stretchable and capable of returning to its original configuration after distortion within predetermined limits. While many such materials would be satisfactory for the sleeve member 36, a preferred material for the application at hand is polyether base polyurethane which is very hard, yet capable of a high elongation. More specifically, the preferred polyurethane material has a Shore "D" hardness of $55 \pm 3$, a minimum elongation of 320 percent, and a tensile strength of 5,500 psi minimum.

A steel sphere or other bulbous member 38 (FIG. 2) having a stem 40 formed thereon is secured to the cable 20 beyond the sleeve member 36 by crimping the stem 40 so as to tightly engage the cable 20. The location of the sphere 38 is such that a predetermined length of cable 20 extends beyond the end of the stem 40 and the length of cable 20 between the sphere 38 and the detent valve 14 permits the sphere 38 and the sleeve member 36 to remain apart until such time as the detent valve 14 bottoms out, the valve 14 having a limited range of movement "a" (FIG. 3), after which the sphere 38 and the sleeve member 36 must overlap with continued movement of the accelerator pedal lever 12.

An accelerator pedal 42 is pivotally connected to the lower end of the lever 12 in a conventional manner, i.e., by a pin 44 secured to the lever 12 and extending through an opening 46 formed in a bracket 48 formed on the back of the pedal 42. A spring 50 mounted on the pin 44 and in contact at its ends with the lever 12 and pedal 42, respectively, serves to maintain the pedal 42 in the desired upright position. The lever 12 has formed thereon an intermediate bent portion 52 which is pivotally confined by a mounting bracket 54 secured to the firewall 56.

The second cable arrangement 16 includes a second cable 58 which is secured by a retainer 60 to a bent end bracket 62 formed on the lever 12. The cable 58 extends through a fitting 64 similar to the fitting 28 and also secured to the dashboard 26, and thence to suitable linkage (not shown) associated with the carburetor throttle plates 18.

It may be noted in FIG. 1 that the depression of the accelerator pedal 42 to its wide open throttle (WOT) position pivots the lever 12 in a clockwise direction about the confined intermediate portion 52 thereof. Such rotation of the lever 12 causes the bracket member 32 to move into contact with the adjacent end face 66 of the sleeve member 36. The detent valve 14 will have reached its full travel position prior to full depression of the pedal 42, and the cable 20 and the sphere 38 secured thereon are held stationary relative to the moving bracket member 32 and the associated sleeve member 36.

Continued depression of the pedal 42 serves to continue to move the bracket member 32 in a clockwise direction (FIG. 1), through a limited range of movement "b" (FIG. 3), thus forcing the chamfered inlet 67 of the right end portion 68 (FIG. 2) of the sleeve member 36 over the sphere 38, the latter moving into the sleeve member 36 until the pedal 42 bottoms out at its WOT position, determined by the wide open stopped position of the throttle plates 18 via the cable 58 and the lever 12. At this point the sphere 38 will have attained some intermediate position within the sleeve member 36, such as that illustrated in FIG. 3. It is a characteristic of the polyurethane material of the sleeve member 36 to spread to accommodate the entry of the sphere 38, and then to resume its original shape once the sphere 38 has passed by. Hence, once the cable 20 has been adjusted to the desired length by the above process, the sphere 38 and the sleeve member 36 relationship will maintain the resultant overall adjusted length throughout all future actuation of the accelerator pedal 42 and the lever 12.

The force required to extrude the sphere 38 through the polyurethane sleeve member 36 is a function of sphere 38 size and shape, and the sleeve member 36 dimensions, hardness, and shape. Proper selection of these parameters allows a relatively constant force throughout the length of adjustment. A relatively constant force throughout a production run is also possible due to the ease with which such parameters are controlled.

It should be apparent that the invention provides a simplified, efficient and durable automatic means for initially adjusting the operative length of a cable, as required for the coordination of the transmission detent valve with the WOT positions of the accelerator pedal and throttle plates.

While but one embodiment of the invention has been shown and described, other modifications thereof are possible.

I claim:

1. A cable length self-adjusting method including the following steps:
   a. pivotally mounting a lever on a fixed abutment, said lever being pivotable through a range of movements to a limit position;
   b. forming an opening through one end of said lever;
   c. extending a cable leading from a movable controlled member through said opening, said member being movable through a range of movements to a limit position;
   d. loosely mounting a sleeve member around the extended end of said cable adjacent said opening, said sleeve member being made of a hard, stretchable material, capable of returning to its original configuration after being stretched;
   e. securing a bulbous member to said cable at a predetermined location thereon adjacent the outer end of said sleeve member;
   f. pivotting said lever so as to abut the lever portion around said opening against said sleeve member and said sleeve member, in turn, against said bulbous member, thereby moving said cable and said movable controlled member to the latter's limit position, and then forcing said sleeve member over said bulbous member until said lever attains its limit position; and
   g. releasing said lever, said sleeve and bulbous members therafter retaining their resultant interconnected position.

2. A cable length self-adjusting method including the following steps:
   a. pivotally mounting an accelerator pedal lever at an intermediate portion thereof on a vehicle firewall;
   b. pivotally mounting an accelerator pedal on said lever below said intermediate portion, said pedal and said lever being movable through a range of movements to a limit position;
   c. forming an opening through said lever above said intermediate portion;
   d. extending a cable leading from a transmission detent valve through said opening, said detent valve being movable through a range of movements to a limit position;
   e. loosely mounting a sleeve member around the extended end of said cable adjacent said opening, said sleeve member being made of a hard, stretchable material, capable of returning to its original configuration after being stretched;
   f. securing a spherical member to said cable at a predetermined location thereon adjacent the outer end of said sleeve member;
   g. depressing said accelerator pedal so as to abut against the lever portion around said opening against said sleeve member and said sleeve member, in turn, against said spherical member, thereby moving said cable and said detent valve to the latter's limit position, and then forcing said sleeve member over said spherical member until said accelerator pedal attains its limit position; and
   h. releasing said accelerator pedal, said sleeve and spherical members thereafter retaining their resultant interconnected position.

3. A cable length self-adjusting method including the following steps:
   a. pivotally mounting an accelerator pedal lever at an intermediate portion thereof on a vehicle firewall;
   b. pivotally mounting an accelerator pedal on said lever below said intermediate portion;
   c. forming an opening through said lever above said intermediate portion;
   d. mounting a retainer in said opening;
   e. extending a cable leading from a transmission detent valve through said retainer, said detent valve having a predetermined path of travel;
   f. loosely mounting a polyurethane sleeve member around the extended end of said cable adjacent said retainer;
   g. securing a spherical member to said cable at a predetermined location thereon adjacent the outer end of said sleeve member;
   h. depressing said accelerator pedal so as to abut said retainer against said sleeve member and said sleeve member, in turn, against said spherical member, thereby moving said cable and said detent valve to the latter's full travel position, and then forcing said sleeve member over said spherical member until said accelerator pedal attains its full travel position; and
   i. releasing said accelerator pedal, said sleeve and spherical members thereafter retaining their resultant interconnected position.

4. A cable length self-adjusting method including the following steps:
   a. pivotally mounting an accelerator pedal lever at an intermediate portion thereof on a vehicle firewall, said lever being pivotable to a stop position;
   b. pivotally mounting an accelerator pedal on said lever below said intermediate portion;
   c. forming a pair of openings through said lever above said intermediate portion;
   d. mounting a retainer in each of said openings;
   e. extending a first cable leading from a transmission detent valve through one of said retainers, said detent valve being movable to a stop position;

f. extending a second cable leading from a carburetor throttle plate through the other of said retainers and securing same therein;

g. loosely mounting a polyurethane sleeve member around the extended end of said first cable adjacent said one of said retainers;

h. securing a spherical member to said first cable at a predetermined location thereon adjacent the outer end of said sleeve member;

i. depressing the accelerator pedal so as to abut said one of said retainers against said sleeve member and said sleeve member, in turn, against said spherical member, thereby moving said first cable and said detent valve to the latter's stop position, and then forcing said sleeve member over said spherical member until said accelerator pedal attains its stop position as limited by the wide open position of said carburetor throttle plate; and j. releasing said accelerator pedal, said sleeve and spherical members thereafter retaining their resultant interconnected position.

5. A cable length self-adjusting arrangement for use with a movable controlled member having a limited range of movement and an actuating lever having a limited range of movement, said arrangement comprising a cable having controlled member attaching means on one end thereof secured to said controlled member, said attaching means having a limited range of movement, abutment means formed on said lever and having a limited range of movement, an opening formed in said abutment means, said cable being loosely mounted through said opening, a sleeve member mounted around said extended cable adjacent said abutment means, said sleeve member being formed of a hard, stretchable material, capable of returning to its original configuration after being stretched, and a bulbous member secured to said cable adjacent said sleeve member, said abutment means causing said attaching means to travel through its limited range of movement upon the initial manual actuation of said lever, abutting against said sleeve member, and forcing said sleeve member onto said bulbous member until said abutment means has traveled through its limited range of movement, thereby coordinating the full travel position of said attaching means with the full travel position of said abutment means, said sleeve member thereafter retaining its resultant adjusted position on said bulbous member.

6. A cable length self-adjusting arrangement for use with a transmission detent valve having a limited range of movement and an accelerator pedal lever having a limited range of movement, said arrangement comprising a cable having valve attaching means on one end thereof secured to said detent valve, said attaching means having a limited range of movement, bracket means formed on said lever and having a limited range of movement, an opening formed in said bracket means, said cable being loosely mounted through said opening, a sleeve member mounted around said extended cable adjacent said bracket means, said sleeve member being formed of a hard, stretchable material, capable of returning to its original configuration after being stretched, and a spherical member secured to said cable adjacent said sleeve member, said bracket means causing said attaching means to travel through its limited range of movement upon the initial manual actuation of said lever abutting against said sleeve member and forcing said sleeve member onto said spherical member until said bracket means has traveled through its limited range of movement, thereby coordinating the full travel position of said attaching means with the full travel position of said bracket means, said sleeve member thereafter retaining its resultant adjusted position on said spherical member.

7. A cable length self-adjusting arrangement comprising a transmission detent valve having a limited range of movement, an accelerator pedal lever having a limited range of movement and pivotally mounted at an intermediate portion thereof, an accelerator pedal pivotally mounted on one end of said lever, a cable secured at one end to said detent valve, said cable having a limited range of movement, a bracket formed on the other end of said lever, an opening formed in said bracket, said cable being loosely mounted through said opening, a polyurethane sleeve member mounted around said extended cable adjacent said bracket, said polyurethane sleeve member being made of a hard, stretchable material, capable of returning to its original configuration after being stretched, and a spherical member secured to said cable adjacent said sleeve member, said bracket abutting against said sleeve member and said sleeve member abutting against said spherical member causing said detent valve to move through its limited range of movement upon the initial manual actuation of said lever, and then forcing said sleeve member onto said spherical member until said accelerator pedal lever has traveled through its limited range of movement, thereby coordinating the full travel position of said detent valve with the full travel position of said accelerator pedal, said sleeve member thereafter retaining its resultant adjusted position on said spherical member.

* * * * *